United States Patent [19]

Zhilin

[11] 4,240,079
[45] Dec. 16, 1980

[54] SYSTEM FOR LOCATING MOBILE OBJECTS IN DISTRESS

[76] Inventor: Viktor A. Zhilin, Vitebsky prospekt, 81, korpus 1, kv. 72, Leningrad, U.S.S.R.

[21] Appl. No.: 936,648

[22] Filed: Aug. 24, 1978

[30] Foreign Application Priority Data

Feb. 7, 1978 [SU] U.S.S.R. ................ 2571001

[51] Int. Cl.$^3$ .............................................. H04B 7/00
[52] U.S. Cl. .............................................. 343/100 ST
[58] Field of Search .................................. 343/100 ST

[56] References Cited
U.S. PATENT DOCUMENTS 4,144,495   3/1979   Metzger ................... 343/100 ST

*Primary Examiner*—Theodore M. Blum
*Attorney, Agent, or Firm*—J. Harold Nissen

[57] ABSTRACT

A system for locating mobile objects in distress comprises emergency radio stations provided on the mobile objects and energized when these mobile objects are in distress, at least one low orbiting earth satellite for retransmission of the signals from the emergency stations, at least one control station for tracking the earth satellite and determining its ephemeris, and at least one receiving station connected with the control station by a communication link and designed for reproduction of the messages transmitted by the emergency stations and for location of the mobile craft. The emergency radio stations are divided into groups with a specified pattern of the two components of a phase-shift-keyed signal, alternating in accordance with the transmitted message, assigned to each group. The receiving station includes a receiver, a reference-frequency oscillator, a signal processing device, their number being equal to that of the groups of emergency stations, and a computer for calculation of the coordinates of the emergency stations, with the input of the computer connected to the communication link. Each of the signal processing devices comprises a first filter and a second filter matched with the first and the second components of the signal from one of the groups of emergency radio stations, respectively, and connected to the output of the receiver, first and second detectors with their inputs connected to the outputs of the first and second filters, respectively, an adder with the two inputs thereof connected, respectively, to the outputs of the first and second detectors, tracking systems provided with a second-order astaticism for measuring the running phase of the envelopes of the received signals from the emergency stations, one of the inputs of each tracking system being connected with the output of the reference-frequency oscillator, and one of its outputs being connected with the other input of the computer, gates with their number equal to that of the tracking systems, and decoders with their number also equal to that of the tracking systems, for decoding the messages transmitted by the emergency stations. The signal inputs of the gates are connected to the output of the adder, the output of each of the gates is connected with the other input of one of the tracking systems, the inhibit inputs of each gate being connected with the other outputs of the remaining tracking systems. Two inputs of each of the decoders are connected to the outputs of the first and second detectors, respectively, while the control input of each decoder is connected with the other output of one of the tracking systems. The proposed system provides the capability of simultaneous operation of a large number of emergency radio stations within one common frequency band.

6 Claims, 17 Drawing Figures

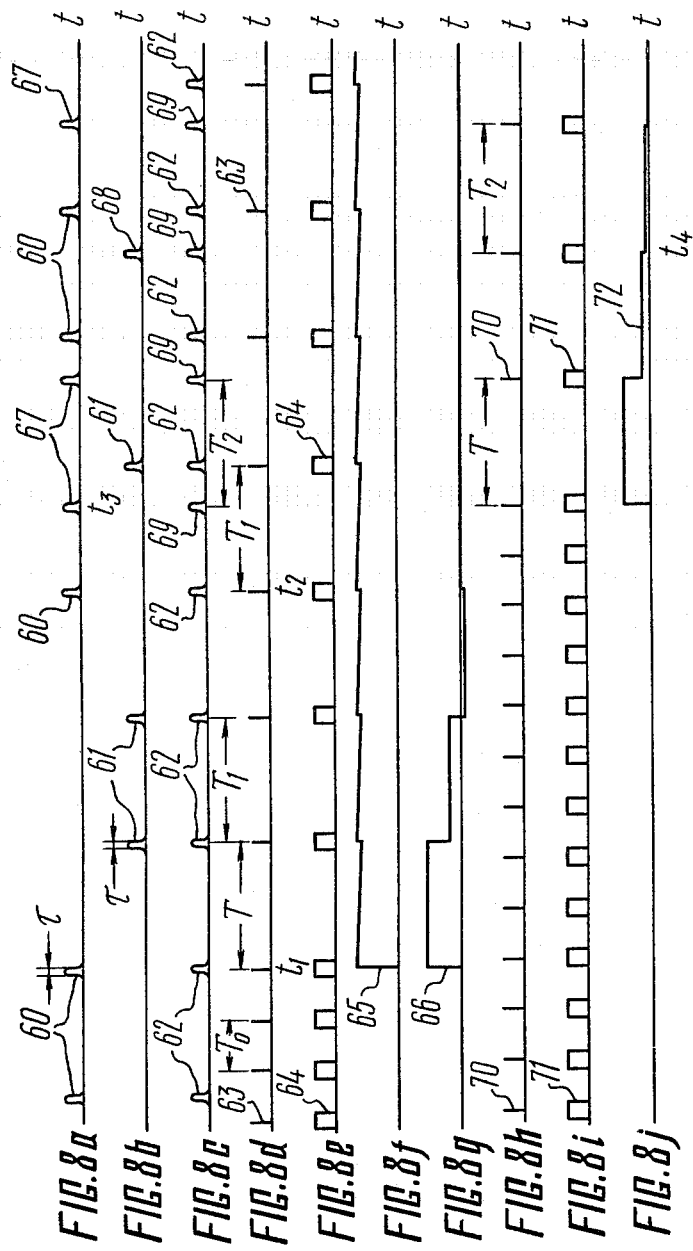

SYSTEM FOR LOCATING MOBILE OBJECTS IN DISTRESS

FIELD OF THE INVENTION

The present invention relates to systems of emergency radio communication and radio determination, and more particularly to systems for locating distressed mobile objects. Such systems can be used for search and providing assistance to people in distress, as a result of shipwreck, emergency landing of an aircraft, or some other trouble with a mobile object.

In what follows hereinbelow, the term 'emergency radio communication and determination system' is intended to imply emergency radio stations for urgent distress alert messages and receiving stations which serve to receive these messages and locate the position of the distress incident. By emergency stations are meant such elements as portable self-powered radio transmitters provided on survival craft, radio buoys dropped from a distressed vessel into the water, or airborne radio transmitters indicating the position of a landed aircraft.

BACKGROUND OF THE INVENTION

As is generally known, an emergency radio communication and determination system employed in the case of distress is expected to allow transmission of messages from any point on the earth's surface for sufficiently large distances and without undue delay. The accuracy of determining the position of the distressed unit should provide for immediate guidance of vessels and aircraft participating in search and rescue missions. The system must permit simultaneous reception and separate processing of distress signals transmitted by dozens of distressed units in the common frequency band.

The emergency stations should be simple in construction, inexpensive and suitable for mass production.

These requirements impose severe limitations on the size and weight of the emergency stations as well as on power consumption for operation thereof.

Known from long-term world-wide experience are emergency radio communication and determination systems comprising emergency stations carried by mobile objects and actuated in case of emergency, and receiving stations provided on all sea vessels, ashore, and on search-and-rescue aircraft. AM and/or FM signals at international distress frequencies of 500 kHz, 2182 kHz, 121.5 MHz and 156.8 MHz are used by emergency radio stations for message transmission purposes. The same signals serve for position location of a distressed unit by means of radio direction-finding.

The disadvantages of such systems are their small coverage (at most 200 to 300 km), low reliability of communication, and insufficient accuracy of position location. These shortcomings may lead to search and rescue operations which are frequently both untimely and inefficient. They are largely caused by physical properties of the frequency bands indicated above, congestion of these bands, impossibility of using reliable and efficient antennae, and limited power resources of emergency stations.

Also known in the prior art is the OPLE system (See "Aviation Week and Space Technology", 1971, Aug. 23, No. 8, pp. 28 to 31) which comprises emergency radio stations including a receiver sensing the signals of the OMEGA Radio Navigation system and a transmitter for retransmission of the signals sensed by this receiver, geostationary satellites for retransmission of these signals, and ground-based receiving stations employed for receiving the signals retransmitted by the satellites and for calculation thereby of the emergency station position.

The disadvantage of this system resides in the complexity of the receiving and transmitting equipment and in the high emergency radio station power required, since high orbiting satellites are employed in the system. Furthermore, distress alerting in the system involves a complicated construction of the emergency stations, an extra power consumption of the stations and additional frequency bands.

Also known in the art is the SAMSARS emergency communication system (see the article by A. Weinberg et al. "A Novel Concept for a Satellite-Based Maritime Search and Rescue System", IEEE Journal of Oceanic Engineering, vol. OE-2, No. 3, July 1977) comprising emergency stations (radio buoys) for transmission of short distress messages, geostationary satellites for retransmission of these messages, and receiving ground stations. The message transmission is accomplished using a wideband binary phase-shift keyed (PSK) signal with a power of about 10 W, the pattern of the signals being the same for all the emergency stations. The use of this signal enables satellites incorporated into other systems, such as the Maritime communication System MARISAT, to be employed for retransmission of the messages, without interference to these systems as a result of operation in the common frequency band. The SAMSARS system is also capable of locating positions of the emergency stations, provided at least three geostationary satellites lie within the radio visibility area of these stations. It is then necessary that the arrival time of the signals received from the emergency stations be recorded at each receiving station using a single time scale.

Since the emergency stations of the SAMSARS systems transmit short distress messages with a small probability of their mutual overlapping, this system can accommodate several mobile objects being simultaneously in distress. The SAMSARS system, however, suffers from serious disadvantages including high power consumption of the emergency stations due to a great satellite-to-earth distance, impossibility to cover polar regions, i.e. the latitudes above 70 deg., and a low accuracy of radio determination near the equator, i.e. at the latitudes below 15 deg., which is accounted for by geometrical factors inherent in geostationary satellite-based systems. Moreover, another disadvantage of the SAMSARS system is the difficulty of radio determination requiring multiple widely spaced satellites in the geostationary orbit.

Another existing system for position location of distressed mobile objects (see J. D. Lambert, A. E. Winter "A Search and Rescue Satellite System (SARSAT)", Experiment Communication Research Centre, Ottawa, Ontario, Canada, 1976) comprises low-power emergency radio stations provided on the mobile objects and transmitting, in case of trouble, continuous sinusoidal signals for a prolonged interval, a low orbiting satellite equipped with a retransmitter for relaying of the signals from emergency stations, a control station for tracking the satellite and calculation of its ephemeris, a receiving ground station for reception of the signals retransmitted by the satellite and calculation of the coordinates of the emergency stations, and a communication link connecting the receiving station with the control station. The receiving station has a phase-locked receiver, a highly stable reference-frequency oscillator, a signal parameter measuring device, and a computer. The device for measurement of the signal parameters is a counter designed for counting the number of beats per unit time, resulting from mixing the received signals applied to one of its inputs from the output of the receiver and the reference-frequency oscillator voltage applied to its other input. The signal parameter measuring device delivers Doppler shift counts of the signal from the emergency station. These counts are introduced into the computer. Based on these counts and the ephemeris of the satellite obtained from the control station, the computer calculates the coordinates of the emergency station using well-known algorithms.

A major disadvantage of this system consists in that the receiving station is not capable of processing signals transmitted simultaneously by several emergency stations in the common frequency band, on account of mutual interference of the emergency stations. On the other hand, the assignment of a reasonable quantity of frequency-division-multiplex (FDM) or time-division-multiplex (TDM) channels for emergency service in a system incorporating hundreds of thousands of emergency stations, out of which number several dozens of stations may transmit distress signals simultaneously, is not found possible, since it is not known beforehand which emergency stations will transmit the distress signals and when.

Another disadvantage of the foregoing system lies in the fact that an additional signal is needed for transmission of the mobile object identification code and the data about the nature of the trouble, and consequently extra power of the emergency station and an additional frequency band are necessary.

SUMMARY OF THE INVENTION

It is a main object of the present invention to provide a system for position location of distressed mobile objects which allows determination of the coordinates of a sufficient number of simultaneously working emergency radio stations and ensures acquisition of the messages transmitted thereby.

Another object of the invention is to reduce the bandwidth occupied by the system for locating the distressed units.

A further object of the invention is to provide a system for locating distressed mobile objects which permits a reliable discrimination of the signals transmitted simultaneously by a number of emergency radio stations as well as a valid reproduction of the messages transmitted thereby.

Still another object of the invention is to reduce power consumption required for the emergency radio stations incorporated into the system for location of the distressed mobile objects.

With these and other objects in view, in a system for position location of distressed mobile objects comprises emitter radio stations carried by the mobile objects and energized when these mobile objects are in distress, at least one low orbiting earth satellite for retransmission of signals emitted by the emergency radio stations, at least one receiving station for the reception of signals relayed by the earth satellite, at least one control station for tracking the earth satellite and calculating the ephemeris thereof, which control station is connected to the receiving station by a communication link, the receiving station including a receiver, a reference-frequency oscillator, a device for measuring signal parameters and having one of its inputs connected to the output of the reference-frequency oscillator, and a computer for calculation of the coordinates of the emergency radio stations, which is connected with one of the outputs of the signal parameter measuring device. According to the invention, the emergency radio stations are divided into groups of stations with a specified pattern of the two components of the PSK-signal assigned to each group within a common frequency band, the components alternating according to the message transmitted, and the signal parameter measuring device represents a set of tracking systems with second-order astaticism providing for the measurement of the running phase of signal envelopes from simultaneously operating emergency radio stations and incorporated into signal processing means equal in number to that of the groups of emergency radio stations, each signal processing means further including a first filter and a second filter respectively matched to the first and the second components of the PSK-signal of one of the groups of emergency radio stations, a first detector and a second detector, an adder, gates equal in number to the tracking systems within one signal processing means, and decoders with their number also equal to that of the tracking systems in one signal processing means, for decoding the messages transmitted by the emergency radio stations, the inputs of the first and the second filter being connected to the output of the receiver, the inputs of the first and the second detector being connected to the outputs of the first and the second filter, respectively, the two inputs of the adder being connected with the outputs of the first and the second detector, respectively, with the output of the adder connected to the signal inputs of the gates, the output of each of the gates being connected with the other input of one of the tracking systems, and the inhibit inputs of each gate being connected to the other inputs of the remaining tracking systems, respectively, the two inputs of each decoder being connected to the outputs of the first and second detector, respectively, and the control input of each decoder being connected with the other output of one of the tracking systems.

The advantages of the present invention will now be discussed. First, the proposed system permits simultaneous operation of a sufficiently large number of emergency radio stations, by virtue of discriminating at the receiving station of the signals transmitted by the plurality of emergency stations in terms of two features, i.e. the pattern and the envelope phase. The discrimination of signals in terms of the first feature is achieved by subdivision of the emergency stations into appropriate groups of stations according to the pattern of the components of the signal assigned thereto, and by provision of the corresponding number of signal processing units at the receiving station, the filters of each processing unit being matched to the signal components of the respective group of emergency stations. The separation of the signals in terms of the latter feature is ensured by employing tracking systems in the signal processing units, with each system tracking the signal of one emergency station. In this case, the signals of all the emergency stations have one common frequency band determined by the width of the unit r.f. pulse of the PSK-signal, thus resulting in an efficient use of the frequency spectrum.

Secondly, the adders and tracking systems present in the signal processing units enable the positions of the mobile objects to be derived from the distress alerting signals emitted by emergency radio stations. The frequency band allocated to the system is thereby reduced, together with other features resulting in a low-power, small-size and lightweight emergency station.

Further, the power of the emergency stations may be reduced by using both of the signal components summed in the adder and employed for measuring the phase of the signal envelopes.

Among the benefits of the proposed system is also its reliable operation, i.e. a low probability of failures in case of short interruptions of the signals received from the emergency radio stations or as a result of time coincidence of the signals arriving from a plurality of emergency stations of one and the same group to within the unit r.f. pulse width. This is due to the fact that tracking systems are characterized by second-order astaticism, i.e. they exhibit some inertia, with the result that the tracking systems, even in the case of interruption of their input signals, continue to phase track the signal, avoiding failure of the tracking systems till the reappearance of the signal.

The gates inserted between the adder and the tracking systems in each signal processing unit ensure a reliable discrimination of signals from several emergency stations within the same group. These gates inhibit the input of each tracking system as the signals already tracked by other tracking systems arrive, and consequently prevent the signal of one emergency station from being sensed by two or more tracking systems.

Finally, the proposed system provides for a correct reproduction of the transmitted messages owing to selection of the signals by the tracking systems as the signals are decoded.

It is preferable that the system include at least one geostationary satellite for retransmission of signals from the low orbiting satellite to the receiving station.

It provides accommodation for mobile objects at any location on the earth's surface with the minimum number of receiving stations available.

Each signal processing unit should preferably comprise additional gates equal in number to the tracking systems, and it is also advisable that the control input of each decoder be connected with the other output of one of the tracking systems via one of these additional gates, the inhibit inputs of each additional gate being connected to the other outputs of the remaining tracking systems.

The additional gates cause the noise immunity of the received messages to be increased and prevent the decoders from delivering distorted messages in case the signals arriving from several emergency stations of the same group overlap to within the width of a unit r.f. pulse. If the additional gates are provided, no messages will be delivered from the decoder outputs, under these conditions. The receiving station, however, is not deprived of capability to reproduce each received message, since all the messages are sent repeatedly and the coincidence time periods are rather small.

Each of the tracking systems may comprise a frequency divider with two division ratio values, the first value providing a repetition period of the frequency divider outputs smaller than that of the signals emitted by the emergency stations, and the second value providing a repetition period of the frequency divider outputs equal to that of the signals emitted by the emergency stations, a tracking strobe and selector pulse shaper, a gate, a time discriminator for generating the misalignment voltage, its magnitude being dependent on the time difference between the tracking strobes and the adder outputs, a feedback circuit including a first integrator, an amplifier, an adding network with the two inputs thereof connected to the outputs of the first integrator and of the amplifier, respectively, and a second integrator with the input thereof connected to the output of the adding network, a phase shifter for displacement of the tracking strobes according to the value of the second integrator output, a phase meter for measuring the amount of displacement of the tracking strobes defining the running phase of the envelope of a signal received from one of the emergency stations, and a control circuit for generation of the control signal defining the second value of the division ratio, which control circuit includes a coincidence circuit, an integrating circuit, and a high input impedance amplifier in series, one of the inputs of the frequency divider being connected to the output of the phase shifter and to one of the inputs of the phase meter, one input of the phase shifter representing one of the inputs of the tracking system and being connected to another input of the phase meter, the other input of the phase shifter being connected with the output of the second integrator, the output of the phase meter representing one of the tracking system outputs, the output of the frequency divider being connected with the input of the tracking strobe and selector pulse shaper, one output of the tracking strobe and selector pulse shaper being connected with one of the inputs of the coincidence circuit and with the signal input of the gate, the output of the latter representing the other output of the tracking system, the other output of the tracking strobe and selector pulse shaper being connected with one input of the time discriminator with its other input representing the other input of the tracking system and connected to the other input of the coincidence circuit, the output of the time discriminator being connected to the inputs of the first integrator and of the feedback circuit amplifier and the output of the control circuit amplifier being connected to the other output of the frequency divider, to the enable input of the gate, and to the third input of the phase meter.

The control circuit incorporated into the tracking system prevents false counts from being delivered to the computer in case the tracked signal is momentarily lost by the tracking system and immediately recovered. Owing to a high time constant of discharging the capacitor of the integrating circuit, the control signal at the output of the control circuit amplifier is not lost after a momentary interruption of the adder output, and the tracking system does not run out of track. This also results in an increased reliability of system operation.

These and other objects and advantages of the present invention will become apparent from the following detailed description of the embodiments thereof with reference to the accompanying drawings.

BRIEF DESCRIPTION OF THE DRAWINGS

FIGS. 8a to 8j are time diagrams of the signals illustrating operation of the tracking system of FIG. 6.

DETAILED DESCRIPTION OF THE INVENTION

Figure 1:
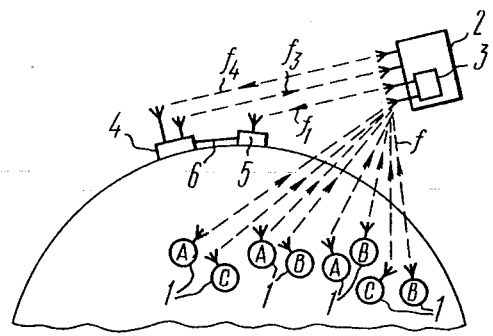
FIG. 1 is a schematic representation of a system for position location of distressed mobile objects, according to one embodiment of the invention.

A system for locating the position of distressed mobile objects, according to the invention, comprises emergency radio stations 1 (FIG. 1) carried by ships, aircraft, or some other mobile units (not shown) and initiating transmission of a distress message in case these objects are in trouble, a low orbiting earth satellite 2 with a retransmitter 3 used for retransmission of the signals emitted by the emergency radio stations 1, a control station 4 for tracking the earth satellite 2 and for determining its ephemeris, and a receiving ground station 5 interconnected by a communication link 6 with the control station 4 and designed to receive the signals relayed by the satellite 2, to reproduce the messages carried by these signals, and to determine the coordinates of the emergency radio stations 1.

For the sake of clarity, only one control station 4, one earth satellite 2, and one receiving station 5 are shown in FIG. 1, although the system as disclosed may comprise several, e.g. five or six, satellites 2, depending on the allowable period of interruption in message transmission, several control stations 4, and several dozens of receiving stations 5 according to the number of regions covered by the system and their surface area.

In order that the total number of receiving stations 5 be reduced, geostationary satellites 7 (FIG. 2) may be incorporated into the system, according to the invention, which serve to retransmit the signals from the low orbiting satellites 2 to the receiving station 5. If a pair of geostationary satellites 7 pass over the Western and Eastern Hemisphere, a single receiving station 5 is sufficient for each hemisphere. Geostationary satellites forming part of the currently designed International Maritime Satellite System (INMARSAT) may perform the function of such satellites 7.

The number of emergency radio stations incorporated into the system may amount to hundreds of thousands, out of which several dozens of stations 1 lying in view of a single satellite 2 can operate simultaneously. As will be shown below when describing the operation of the system, PSK-signals representing a sequence of two components and occupying the common frequency band are employed for transmission of distress messages. For the purpose of separating the signals of simultaneously operating emergency radio stations 1, as they arrive at the receiving station 5, all the emergency stations 1 are broken down into groups, and a specified pattern of the two-component PSK-signal is assigned to each group. FIG. 1 shows three such groups of emergency stations 1 designated by characters A, B, and C, respectively; the number of groups of emergency stations, however, may be considerably greater than that, amounting to as much as twenty groups.

Figures 3, 4:
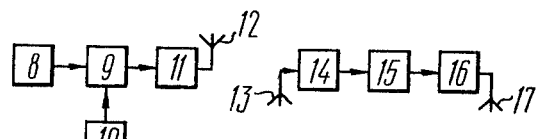
FIG. 3 is a simplified block diagram of an emergency radio station of the system of FIGS. 1, 2.
FIG. 4 is a simplified block diagram of a retransmitter carried by an earth satellite of the system shown in FIGS. 1, 2.

FIG. 3 shows a simplified block diagram of an emergency radio station which comprises a carrier-frequency supply unit 8, a modulator 9, a message signal shaper 10, a power amplifier 11, and a non-directional transmitting antenna 12. The message signal shaper 10 represents a device such as a nondestructive readout memory wherein the information to be transmitted in an emergency is stored in discrete form, i.e. in the form of a sequence of digits '0' and '1'. The output of the message shaper 10 is connected with one input of the modulator 9 which serves to convert the '0' and '1' digits to the components of the PSK-signal. The other input of the modulator 9 is connected with the output of the carrier-frequency supply unit 8. The output of the modulator 9 is connected to the input of the power amplifier 11 with the output thereof connected to the nondirectional transmitting antenna 12.

The retransmitter 3 (FIG. 1) of the satellite 2 comprises a non-directional receiving antenna 13 (FIG. 4) with the input of a receiver 14 connected thereto, the frequency response of the receiver being matched to the frequency spectrum occupied by the signals emitted from the emergency stations 1 (FIG. 1). The output of the receiver 14 (FIG. 4) is connected with a frequency converter 15 for conversion of the signal frequency received by the receiver 14 to the transmission frequency. A power amplifier 16 with a non-directional transmitting antenna 17 is connected to the output of the frequency converter 15 and serves to amplify and radiate the retransmitted signals.

The retransmitter (not shown) carried by the geostationary satellite 7 (FIG. 2) has a circuit similar to that of the retransmitter 3, except that the receive and transmit frequency ratings of the two retransmitters are different.

It will be noted that the receive frequencies of the satellites 2 (FIG. 1) are all identical, while the transmit frequencies of individual satellites 2 may be different.

The receiving station 5 comprises a receiver 18 (FIG. 5) with stringent limitations, its input being connected to a receiving antenna 19, signal processing means 20 in parallel with the output of the receiver 18, a highly stabilized reference-frequency oscillator 21, and an electronic computer 22 for calculation of the coordinates of the emergency radio stations 1 (FIG. 1), an input 23 (FIG. 5) of the computer being connected with the communication link 6 (FIG. 1). The number of signal processing means 20 (FIG. 5) in the receiving station 5 (FIG. 1) is equal to the number groups of emergency stations 1 incorporated into the system.

Each signal processing means 20 (FIG. 5) has provided at the input thereof a pair of filters 24, 25, the filter 24 being matched, for example, to the first component of the PSK-signals emitted by the emergency stations 1 (FIG. 1) of one group of stations, and the filter 25 (FIG. 5) being matched to the second component of these signals. The signal processing means 20 are all of the same configuration except that the filters 24, 25 in each signal processing means 20 are matched to the components of the signals assigned to the corresponding group of emergency stations 1 (FIG. 1). By way of example the filters 24, 25 (FIG. 5) 25 of the first signal processing means 20 are matched to the components of the signal of Group A (FIG. 1) from the emergency stations 1, the filters 24, 25 (FIG. 5) 25 of the second means are matched to the components of the signal of Group B (FIG. 1) from the emergency stations 1, etc. Each of the filters 24, 25 (FIG. 5) 25 represents a correlator such as a digital correlator. The outputs of the filters 24, 25 are connected with the inputs of detectors 26, 27 for detection of the envelope of each signal component, respectively.

The outputs of the detectors 26, 27 are connected with two inputs of an adder 28, respectively, and with two inputs of decoders 29, 30, 31 each employed for decoding the message emitted by one emergency radio station 1 (FIG. 1) and having a control input for selecting the signals arriving from the outputs of the detectors 26, 27 (FIG. 5) 27.

The signal processing means 20 further comprises tracking systems 32, 33, 34 with second-order astaticism, the tracking systems being equal in number to the decoders 29, 30, 31. Each of the tracking systems 32, 33, 34 is designed for time search mode of operation for searching the signals received from the output of the adder 28 and for tracking the envelope phase of each of these signals, providing for measurement of a running envelope phase of the signal tracked. One input 35 of each of the tracking systems 32, 33, 34 is connected with the output of the reference-frequency oscillator 21.

Gates 36, 37, 38 inserted between the output of the adder 28 and inputs 39 of the tracking systems 32, 33, 34, respectively, serve to separate the signals emitted by the emergency radio stations 1 (FIG. 1) of one group. These gates 36, 37, 38 each have three inputs, one of them being a signal input, and the other two being inhibit inputs. The signal inputs of the gates 36, 37, 38 are connected with the output of the adder 28, while the inhibit inputs of each of these gates 36, 37, 38 are connected with outputs 40 of those tracking systems whose inputs 39 are not connected with the output of this gate; that is to say, the inhibit inputs of the gate 36 are connected with the outputs 40 of the tracking systems 33 and 34, respectively, the inhibit inputs of the gate 37 are connected with the outputs 40 of the tracking systems 32 and 34, respectively, and the inhibit inputs of the gate 38 are connected with the outputs 40 of the tracking systems 32 and 33, respectively. Consequently, each of the gates 36, 37, 38 prevents the outputs of the adder 28 tracked by other tracking systems from reaching the particular tracking system connected to the output of the gate.

The outputs 40 of the tracking systems 32, 33, 34 are likewise connected with the control inputs of the decoders 29, 30, 31, respectively. As a result of this, the components of the signals emitted by several (in this case, three) emergency radio stations 1 (FIG. 1) within one group, received from the outputs of the detectors 26, 27 (FIG. 5) 27 are caused to be separated at the inputs of the decoders 29, 30, 31, i.e. the components of only that signal which is tracked by the tracking system coupled with the particular one of the decoders 29, 30, 31 are allowed to pass into this decoder.

The outputs 41 of the tracking systems 32, 33, 34 are connected with an input 42 of the computer 22.

Figure 5:
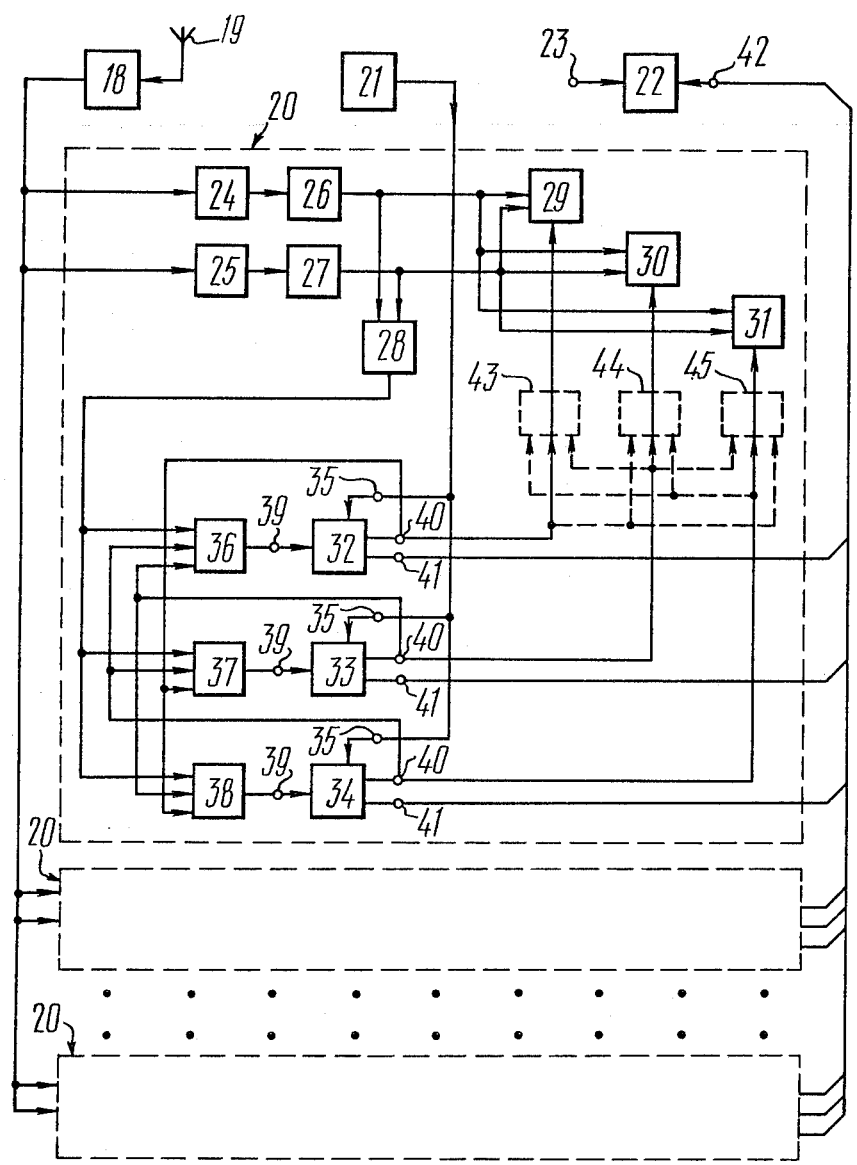
FIG. 5 is a block diagram of a receiving station of the system shown in FIGS. 1, 2.

Inserted, if necessary, between the control inputs of the decoders 29, 30, 31 and the outputs 40 of the tracking systems 32, 33, 34 are additional gates 43, 44, 45, respectively, indicated by dashed lines in FIG. 5, the tracking systems 32, 33, 34 being connected to the enable inputs of the gates 43, 44, 45, respectively. Two inhibit inputs of each of these additional gates 43, 44, 45 are connected with the outputs 40 of the two remaining tracking systems. In particular, the inhibit inputs of the gate 43 are connected with the outputs 40 of the tracking systems 33 and 34 respectively, the inhibit inputs of the gate 44 are connected with the outputs 40 of the tracking systems 32 and 34, respectively, and the inhibit inputs of the gate 45 are connected with the outputs 40 of the tracking systems 32 and 33, respectively. (These connections are also indicated by dashed lines in FIG. 5). It will be seen that the number of inhibit inputs of each of the additional gates 43, 44, 45 as well as of the gates 36, 37, 38, is one less than the number of tracking systems 32, 33, 34 or decoders 29, 30, 31 within one signal processing means 20.

It is the purpose of the additional gates 43, 44, 45 to prevent the decoders 29, 30, 31 (or two of them) from delivering messages which may be distorted as a result of time coincidence between the components of signals from three (or two) emergency radio stations 1 (FIG. 1) occurring at the outputs of the detectors 26, 27.

FIG. 5 shows that one signal processing means 20 includes three tracking systems 32, 33, 34, three decoders 29, 30, 31, three gates 36, 37, 38, and three additional gates 43, 44, 45 (if any). This quantity (three) of identical components, however, is only shown for the sake of illustration. As will be indicated below, this quantity is based upon the maximum expected number of emergency stations 1 (FIG. 1) of the same group being in simultaneous operation, but it may be greater than that shown in FIG. 5 amounting to as much as five or six. The number of inhibit inputs of the gates 36, 37, 38 and the inhibit inputs of the additional gates 43, 44, 45 is then correspondingly increased.

The tracking systems 32, 33, 34 in the signal processing means are all identical. The tracking systems 32, 33, 34 each comprise a variable division-ratio frequency divider 46 (FIG. 6), a tracking strobe and selector pulse shaper 47, a gate 48, a time discriminator 49, a control circuit 50, a phase shifter 51, a phase meter 52, and a feedback circuit formed by a first integrator 53, an amplifier 54, an adding network 55 with one input thereof connected to the output of the first integrator 53 and the other input connected to the output of the amplifier 54, and a second integrator 56 with its input connected to the output of the adding network 55.

The frequency divider 46 is provided with two values of the division ratio, the first value of the ratio ensuring the time search operation of the tracking system to search the signals applied to the input 39 of the tracking system from the output of the respective one of the gates 36, 37, 38 (FIG. 5), and the second value of the division ratio ensuring the tracking mode of the system, for tracking one of these signals. The output of the frequency divider 46 (FIG. 6) is connected to the input of the tracking strobe and selector pulse shaper 47 with one of its outputs delivering selector pulses and connected to the signal input of the gate 48, the other output being connected to one of the inputs of the time discriminator 49 to allow delivering of the tracking strobes. The output of the gate 48 is the output 40 of the tracking system. The gate 48 serves as a means for suppression of noise generated by the selector pulses of one of the tracking systems and interfering with the other tracking systems, when this tracking system is in the search mode of operation. The tracking strobes are used to determine the envelope phase of the signal tracked by the tracking system, while the selector pulses serve to coordinate operation of the decoders 29 (FIG. 5), 30, 31 and of the remaining tracking systems incorporated into the signal processing means 20. The other input of the time discriminator 49 (FIG. 6) is the input 39 of the tracking system.

The time discriminator 49 is employed to generate the misalignment voltage with its magnitude dependent on the time difference between the tracking strobes and the signals applied to the input 39 of the tracking system. The output of the time discriminator 49 is connected to the inputs of the first integrator 53 and the amplifier 54, while the output of the second integrator 56 is connected to one of the inputs of the phase shifter 51, the other input of the latter being the input 35 of the tracking system.

The amplifier 54 and the adding network 55 are inserted into the feedback circuit to ensure stability of the tracking system operation.

The phase shifter 51 which is the controlled member of the tracking system serves to control the phase of the tracking strobes according to the magnitude of the output of the second integrator 56. The output of the phase shifter 51 is connected with one of the inputs of the frequency divider 46 and with one of the inputs of the phase meter 52 which enables the shift of the strobes effected by the phase shifter 51 to be measured. The other input of the phase meter 52 is connected with the input 35 of the tracking system. The output of the phase meter 52 serves as the output 41 of the tracking system.

The input 39 of the tracking system is also connected with one of the inputs of a coincidence circuit 57 which forms part of the control circuit 50, the other input of the coincidence circuit being connected with that output of the shaper 47 delivering selector pulses. The control circuit 50 is designed to produce a control signal for switching of the tracking system from the search mode to the tracking mode, and conversely, by changing the value of the division ratio of the frequency divider 46, and also for controlling the gate 48 and selecting the measurement results of the phase meter 52. The control circuit further includes an RC integrating circuit 58 and a high input impedance amplifier 59 in series. The output of the amplifier 59 is connected with the other input of the frequency divider 46, with a third input of the phase meter 52, and with the enable input of the gate 48.

The operation of the proposed system will now be discussed.

When a mobile object is found to be in trouble, the emergency radio station 1 (FIG. 1) provided thereon is actuated manually or automatically. Formalized information containing the identification number of the mobile object, data concerning the nature of distress (e.g. fire, explosion, collision of ships, loss of control, emergency aircraft landing, etc.), and the kind of help required is introduced into the message shaper 10 (FIG. 3). If the International Telegraph Code No. 2 is used, the size of this message amounts to some two hundred binary digits '0' and '1', i.e. bits.

Figure 7:
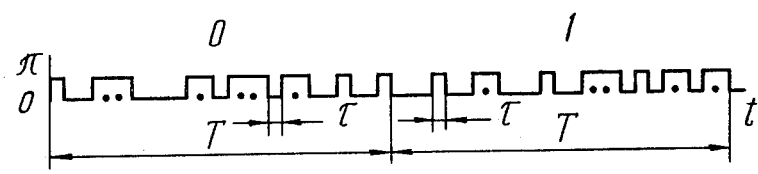
FIG. 7 is an example of phase variation of unit r.f. pulses of signal components used for distress alerting purposes, according to the invention.

The message pattern in the form of a sequence of digits '0' and '1' enters the modulator 9 wherein the voltage of the carrier supply unit 8 is phase-shift keyed in accordance with the messsage transmitted. The output of the modulator 9 is a PSK-signal composed of two components alternating in accordance with the transmitted message, one component representing digit '0' and the other component representing digit '1'. The components of the PSK-signal appear as a sequence of unit r.f. pulses closely adjoining to one another and being of the same amplitude, of the same mark-to-space ratio equal to the carrier-frequency 'f' of the supply unit 8, of the same width $\tau$, and with an initial phase subject to pulse-to-pulse variation in steps equal to a multiple of $\tau$, following a predetermined law. In this case, the component representing digit '0' follows a different law of phase variation of unit r.f. pulses as compared to the component representing digit '1'. An illustrative example of unit pulse phase variation for each of the signal components is shown in FIG. 7, where $\tau$ is the unit r.f. pulse width.

Each component of the PSK-signal (i.e. one bit) appears as a sequence of, say, 256 unit r.f. pulses so as to provide a reliable discrimination of signal components at the receiving station 5 (FIG. 1).

The width 'T' (FIG. 7) of each signal component is equal to the repetition period of the message bits transmitted. The resultant PSK-signal is applied to the power amplifier 11 (FIG. 3) and radiated by the non-directional antenna 12 of the emergency station 1 (FIG. 1) at a frequency 'f'.

As previously mentioned, the plurality of emergency radio stations 1 is divided into groups, the emergency stations included in the same group having an identical pattern of each signal component. The signals of the emergency stations 1 belonging to different groups exhibit different patterns of components, i.e. they follow different laws of unit pulse phase variation within each component. This law is chosen so that the signal components in each group of emergency stations 1 are orthogonal or quasi-orthogonal. The signals of all the emergency stations 1 fall into the same frequency band determined by the unit pulse width $\tau$ (FIG. 7).

When the satellite 2 (FIG. 1) passes over an operating emergency radio station 1, the signal of this station is received at a frequency 'f' by the receiver 14 (FIG. 4) of the retransmitter 3 (FIG. 1) provided on the satellite 2, and is converted by the frequency converter 15 (FIG. 4), amplified by the power amplifier 16 and radiated by the antenna 17 at a frequency of $f_1$.

Figure 2:
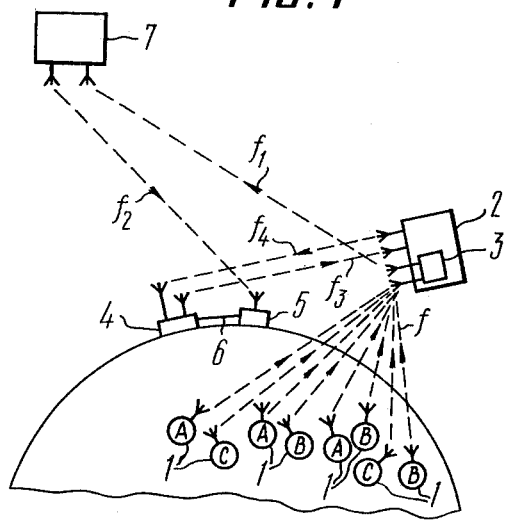
FIG. 2 is a schematic representation of a system for position location of distressed mobile objects, according to another embodiment of the invention.

The signal retransmitted by the satellite 2 (FIG. 1) is received by the receiving station 5 either directly or via the geostationary satellite 7 (FIG. 2). In the former case, the receiver 18 (FIG. 5) of the receiving station 5 (FIG. 1) is operated at the transmit frequency $f_1$ of the satellite 2, while in the latter case, it is operated at the transmit frequency $f_2$ of the geostationary satellite 7 (FIG. 2). In all other respects, the operation of the system according to the invention is identical for both cases, and in the following discussion of devices common for both FIG. 1 and FIG. 2, only the former will be referred to, for simplicity.

The signal received by the receiver 18 (FIG. 5) is applied to the inputs of the signal processing means 20 and filtered in one of these means 20 by the filters 24, 25 matched to the signal components of that group of emergency stations 1 (FIG. 1) to which this particular operating emergency station belongs, e.g. group A. The response of the filter 24 (FIG. 5) to the first signal component and the response of the filter 25 to the second signal component is an r.f. pulse of a width $\tau$ and with an amplitude equal to $\tau/T$ times the unit r.f. pulse amplitude at the filter input. The output r.f. pulses of the filters 24, 25 are detected by the detectors 26, 27, respectively, resulting in recovery of their envelopes 60 (FIG. 8a), 61 (FIG. 8b). The detected signal components arrive at the decoders 29 (FIG. 5), 30, 31 and are applied to the adder 28 wherein they are added to form a continuous sequence of pulses 62 (FIG. 8c). The repetition period $T_1$ of these pulses 62 is somewhat different from the repetition period T of the signal emitted by the emergency station 1 (FIG. 1), due to Doppler effect. This sequence of pulses 62 (FIG. 8c) delivered from the output of the adder 28 (FIG. 5) is then applied to the input 39 of the tracking systems 32, 33, 34 via the gates 36, 37, 38.

Initially, the tracking systems 32, 33, 34 are operated in the time search mode. Consider the operation of one these tracking systems, e.g. the system 32.

A sine voltage is supplied from the output of the reference-frequency oscillator 21 to the input 35 of the tracking system 32, which voltage is applied, via the phase shifter 51, (FIG. 6) to one of the inputs of the frequency divider 46.

The frequency divider 46 divides the frequency of this voltage. With no control signal applied from the amplifier 59 to the other input of the divider, its division ratio will be so chosen that the outputs of the frequency divider 46 have a repetition period $T_o$ smaller than the repetition period T of the signal transmitted by the emergency station 1 (FIG. 1) and equal, for example, to several $\tau$'s. The outputs of the frequency divider 46 (FIG. 6) are applied to the input of the tracking strobe and selector pulse shaper 47. The tracking strobes 63 (FIG. 8d) and the selector pulses 64 (FIG. 8e) supplied from the respective outputs of the shaper 47 (FIG. 6) both have the same repetition period $T_o$ (FIG. 8d) in the search mode represented by the frequency divider 46 (FIG. 6), the tracking strobes 63 (FIG. 8d) being somewhat delayed relative to the selector pulses 64 (FIG. 8e) and having a smaller width compared thereto.

The selector pulses 64 arrive at one of the inputs of the coincidence circuit 57 (FIG. 6) with the signals 62 (FIG. 8c) from the output of the adder 28 (FIG. 5) applied to the other input thereof via the gate 36 (FIG. 5). The search mode of operation will continue until the signal 62 (FIG. 8c) has coincided with one of the selector pulses 64 (FIG. 8e) at the time $t_1$ (FIG. 8d). The coincidence circuit 57 (FIG. 6) is tripped, the capacitor (not shown) of the integrating circuit 58 is charged, and a control signal 65 (FIG. 8f) is delivered from the output of the amplifier 59 to the other input of the frequency divider 46 (FIG. 6) and serves as a command to switch the tracking system 32 (FIG. 5) from the search mode to the tracking mode. Under the action of the control signal 65 (FIG. 8f), the division ratio of the frequency divider 46 (FIG. 6) is caused to change so that the repetition period of its output signals and, consequently, the repetition period of the selector pulses 64 (FIG. 8e) and the tracking strobes 63 (FIG. 8d) comes to equal the repetition period T of the signal emitted by the emergency station 1 (FIG. 1).

Figure 6:
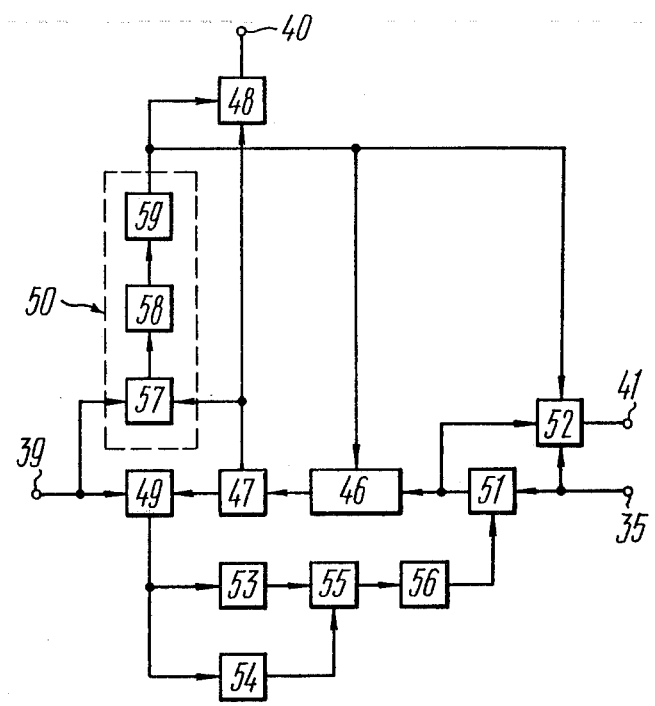
FIG. 6 is a functional block diagram of a tracking system of the receiving station shown in FIG. 5.

At the same time instant $t_1$ (FIG. 8d), in the time discriminator 49 (FIG. 6), there occurs a coincidence of one of the tracking strobes 63 (FIG. 8d) with the signal 62 (FIG. 8c) delivered from the output of the adder 28 (FIG. 5) to within the unit pulse width $\tau$. A resultant misalignment voltage 66 (FIG. 8g) at the output of the discriminator 49 (FIG. 6) is applied to the feedback circuit wherein it is integrated twice by the integrators 53 (FIG. 6) and 56. The integrated output of the second integrator 56 drives the phase shifter 51 so that the latter shifts the phase of the voltage across the reference-frequency oscillator 21 (FIG. 5) by an amount such that the tracking strobes 63 (FIG. 8d) are shifted in a direction of reduction in the time unbalance between the strobes and the signal 62 (FIG. 8c) applied to the input 39 (FIG. 6). At the end of a time interval equal to several T's, the tracking strobes 63 (FIG. 8d) and the selector pulses 64 (FIG. 8e) will exactly coincide with the signal 62 (FIG. 8c). The misalignment voltage 66 (FIG. 8g) will then be close to zero, and at the time instant $t_2$, the repetition period of the tracking strobes 63 (FIG. 8d) and the selector pulses 64 (FIG. 8e) will become equal to the repetition period $T_1$ of the signal received by the receiving station 5 (FIG. 1).

In the process of tracking, the phase shifter 51 (FIG. 6) causes the phase of the voltage across the reference-frequency oscillator 21 (FIG. 5) applied to the frequency divider 46 to be continuously varied according to the change in envelope phase of the received signal 62 (FIG. 8c), which is due to the movement of the satellite 2 (FIG. 1). These phase variations are measured by the phase meter 52 (FIG. 6), and with the control signal 65 (FIG. 8f) supplied from the output of the amplifier 59 (FIG. 6) to one of the inputs of the phase meter 52, the measurement results are fed from the output 41 into the computer 22 (FIG. 5). Based on a series of such readings of the phase meter 52 (FIG. 6) and on the ephemeris of the satellite 2 (FIG. 1) and taking account of the previously known ephemeris of the satellite 7 (FIG. 2), if any, the coordinates of the emergency station 1 (FIG. 1) are calculated by the computer 22 (FIG. 5) using conventional algorithms.

The data relating to the ephemeris of the satellite 2 are routed from the control station 4 over the communication link 6 to the receiving station 5. In order to obtain these data, the control station 4 sends commands, at a frequency $f_3$, to the satellite 2 and receives the telemetry data therefrom at a frequency $f_4$.

The signal tracking process, e.g. by the tracking system 32 (FIG. 5) is maintained as long as a voltage resulting from the coincidence between the received signal 62 (FIG. 8c) and the selector pulses 64 (FIG. 8e) in the coincidence circuit 57 (FIG. 6) is present at the output of the integrating circuit 58 (FIG. 6).

When the signal 62 (FIG. 8c) disappears, the capacitor (not shown) of the integrating circuit 58 (FIG. 6) is discharged through the high input impedance of the amplifier 59, and when the control signal 65 (FIG. 8f) from the output of the amplifier 59 (FIG. 6) is lost, the division ratio of the frequency divider 46 comes to be equal to its original value, causing the system to be switched over to the signal time search mode of operation. The discharge time constant for the capacitor of the integrating circuit 58 is so chosen that in case of a momentary interruption of the signal 62 (FIG. 8c), e.g. for a time equal to several dozens of T, the tracking system keeps on working in the tracking mode despite the temporary absence of the signal 62. Owing to the tracking systems 32, 33, 34 (FIG. 5) according to the invention, having second order astaticism, i.e. including a pair of integrators 53 (FIG. 6) and 56 in the feedback circuit, the phase of the tracking strobes 63 (FIG. 8d) continues to change with the same speed as the phase of the signal 62 (FIG. 8c) despite such short interruption of the latter, and there occurs no failure of the tracking system, i.e. the system continues to operate till the recovery of the signal 62.

The tracking system 32 (FIG. 5) when operating in the tracking mode, i.e. after passing the time instant $t_1$, delivers the selector pulses 64 (FIG. 8e) via the gate 48 (FIG. 6) from the output 40. The gate 48 is enabled to deliver these selector pulses 64 under the action of the control signal 65 (FIG. 8f) fed from the output of the amplifier 59 (FIG. 6).

The selector pulses 64 (FIG. 8e) are applied to the gate 36 (FIG. 5), 37, 38 and the additional gates 43, 44, 45, resulting in the following operations:

1. The gates 37 and 38 are turned off preventing the tracking systems 33 and 34 from acquiring the signal which is already being tracked by the tracking system 32;
2. A signal is selected in the decoder 29, which is tracked by the tracking system 32;
3. The gates 44 and 45 are turned off, thus preventing the decoders 30 and 31 from decoding the signal which is being processed by the decoder 29.

The message received from the emergency station 1 (FIG. 1) is now delivered by the decoder 29 (FIG. 5).

Suppose now that starting from the time instant $t_3$ (FIG. 8a), another emergency station 1 is in operation within the 'radiovisibility' zone of one satellite 2 (FIG. 1). If this second emergency station 1 belongs to another group of emergency stations 1, such as Group B, its signal will be processed at the receiving station 5 in the previously described fashion, by another signal processing means 20 (FIG. 5) with the filters 24, 25 thereof matched to the signal components of group B. Consider the case when both the second operating emergency station 1 (FIG. 1) and the first emergency station 1 belong to one and the same group A.

The signal from the second emergency station 1 relayed by the satellite 2 is received by the receiver 18 (FIG. 5) and the components of this signal are detected by the filters 24, 25 of the respective signal processing means 20. The detected components 67 (FIG. 8a) and 68 (FIG. 8b) of the signal from the second emergency station 1 (FIG. 1) are summed up in the adder 28 (FIG. 5) to produce a continuous sequence of pulses 69 (FIG. 8c) with a repetition period $T_2$, differing from both the repetition period T of the signals emitted by the emergency station 1 (FIG. 1) and the repetition period $T_1$ of the signal 62 (FIG. 8c) received by the receiving station 5 (FIG. 1) from the first operating emergency station 1, due to Doppler effect. Furthermore, the pulse sequence of the signal 69 (FIG. 8c) from the second emergency station 1 (FIG. 1) will be more likely shifted in time with respect to the pulse sequence of the signal 62 (FIG. 8c) from the first emergency station 1 (FIG. 1). When tracking strobes 70 (FIG. 8h) and selector pulses 71 (FIG. 8i) of one of the idle tracking systems, such as the system 33 (FIG. 5) coincide with the signal 69 (FIG. 8c) from the second emergency station 1 (FIG. 1), as a result of search operation, this latter signal will be acquired by the tracking system 33 (FIG. 5). After a misalignment voltage 72 (FIG. 8j) at the output of the time discriminator 49 (FIG. 6) in the tracking system 33 (FIG. 5) has been reduced to zero, i.e. at the end of the transient period, at the time instant $t_4$ (FIG. 8j), the repetition periods of the tracking strobes 70 (FIG. 8h) and the selector pulses 71 (FIG. 8i) of the tracking system 33 (FIG. 5) will be both equal to the repetition period $T_2$ of the signal 69 (FIG. 8c) from the second emergency station 1 (FIG. 1).

The tracking system 33 (FIG. 5) will begin to deliver phase envelope counts of the signal 69 (FIG. 8c) of the second emergency station 1 (FIG. 1) from the output 41 to the computer 22 (FIG. 5), and the selector pulses 71 (FIG. 8i) from the output 40 to the gates 36 (FIG. 5), 38, 43, 44, and 45. The selector pulses 71 (FIG. 8i) will block the tracking systems 32 (FIG. 5) and 34 for the period of action of the signal pulses 69 (FIG. 8c) from the second emergency station 1 (FIG. 1), will permit selection of the signal from the second emergency station 1 in the decoder 30 (FIG. 5), and will block the decoders 29 (FIG. 5) and 31 for the period of action of the signal pulses 69 (FIG. 8c) from the second emergency station 1 (FIG. 1). The decoder 30 will deliver the message of the second emergency station 1 (FIG. 1).

It is possible that, in the process of tracking, two or more signals transmitted simultaneously by the emergency stations 1 of one group will coincide to within the selector pulse width, resulting in mutual interference. This coincidence phenomenon, if it does occur, will persist only a short time which is an insignificant portion of the period when each of the distressed units remains in the zone of 'radiovisibility' of one satellite 2. The signal phase counts obtained during this period need not be taken into consideration, and the receiving station 5 is still capable of fixing the position of each object. The reception of the messages emitted by the emergency stations 1 will also remain possible since these messages are sent repeatedly.

The present invention provides the capability of preventing a failure of the tracking systems 32, 33, 34 (FIG. 5) in the case of time coincidence of the received signals as described above. This is attained in the following manner. Let it be assumed that the signals from three emergency stations 1 (FIG. 1) arriving at the inputs 39 (FIG. 5) of the tracking systems 32, 33, and 34 have overlapped for a time interval equal to several repetition periods T or even several tens of periods T. In this case, the selector pulses delivered by these tracking systems will also coincide. Consequently, the gates 36, 37, 38 and the gates 43, 44, 45 will be cut off and the signals will be prevented from reaching the inputs 39 of the tracking systems 32, 33, 34 as long as the selector pulses fully or partially overlap. But since the tracking systems 32, 33, 34 are provided with second order astaticism and exhibit a certain inertia, the phase of the tracking strobes will be changing at a speed approximating the phase variation rate of the signals being tracked, thus preventing the tracking systems 32, 33, and 34 from running out of track. At the same time, the selector pulses will block the inputs of the decoders 29, 30, 31 so that no messages will be delivered during the period of signal coincidence.

Theretofore there has been discussed the process of discrimination, at the receiving station 5 (FIG. 1), of the signals arriving from simultaneously operating emergency stations 1, the discrimination being carried out by the signal pattern (for emergency stations 1 of different groups) and by the signal phase envelope (for emergency stations 1 of the same group).

It is now advisable to determine the optimum number of tracking systems 32, 33, 34 (FIG. 5) and hence the number of decoders 29, 30, 31 in one signal processing means 20.

The number of signals processed by each of the signal processing means 20 is dependent on the number of emergency stations 1 (FIG. 1) simultaneously in operation in view of the satellite 2, and it is given by the binomial probability distribution formula:

$$P_{m,n} = \frac{n!}{m!(n-m)!} P^m (1-P)^{n-m}$$

where $P_{m,n}$ is the probability that 'm' out of 'n' simultaneously operating emergency stations belong to a group with the signal pattern corresponding to the filters of this particular signal processing means;

$p=1/N$ is the probability that the signal which has reached the receiving station is associated with an emergency station of the group with its serial number corresponding to that of the signal processing means in question;

N is the number of groups of emergency stations (or the number of signal processing means at the receiving station).

For example, with $N=20$ and $n=30$, the probability $P_{m,n}$ is a function of 'm' as shown in the following table:

| m | 0 | 1 | 2 | 3 | 4 | 5 | 6 | 7 |
|---|---|---|---|---|---|---|---|---|
| $P_{m,n}$ | 0.21 | 0.345 | 0.26 | 0.127 | 0.044 | 0.012 | 0.0026 | 0.00049 |

It will be seen from the data indicated above that if thirty emergency stations are simultaneously in operation, the probability that six or more signals of the same pattern are sensed by some signal processing means will not exceed 0.003. Actually, the probability of the signal processing means being loaded in this way will be substantially smaller, which is due to the low probability of simultaneous distress situations in thirty objects within the view of a single low orbiting satellite. So it is sufficient to provide no more than five or six tracking systems and a correspondingly low number of decoders in each signal processing means.

The system according to the invention can be implemented with the following performance data:

| | |
|---|---|
| carrier frequency of emergency stations | 406.5 MHz |
| unit r.f. pulse width | 10 µs |
| repetition period of PSK-signal components | 2560 µs |
| message rate | 2 telegraph characters per second (see note) |
| time of a single transmission of message | 20 s |
| transmission power of emergency stations | 0.05 W |
| emergency station antenna gain | 0 dB |
| free-space loss (for the height of the satellite of 1000 km, an elevation angle of 10 deg.) | 153.8 dB |
| loss in the section 'emergency station-low orbiting satellite' (ionospheric absorption, scintillation, multipath effect) | 12 dB |
| gain of retransmitter antenna on the low orbiting satellite | 0 dB |
| receiver noise factor of the retransmitter on the low orbiting satellite | 3 dB |
| equivalent noise temperature of the system | 1000° K. |
| received signal power to noise spectral density ratio | 20 dB Hz |
| bit error probability | $10^{-5}$ |
| tracking system gain | $2.4 \, s^{-2}$ |
| received signal phase measurement error (maximum dynamic and r.m.s. fluctuation error) | 0.06 µs |

Note:
one telegraph character is transmitted by five bits; one bit is represented by 40 sequences of PSK-signal type '0' or '1'.

The present invention provides for simultaneous operation, within the common frequency band, of a sufficiently large number of emergency stations operating within the range of one low orbiting satellite.

This feature of the proposed system provides accommodation for ships, aircraft, and other mobile craft, on an international basis.

The above specific embodiments of the invention are only given by way of example and impose no limitations on the scope thereof as defined by the following claims.

What is claimed is:

1. A system for location of mobile objects in distress comprising:

emergency radio stations each provided on one of the mobile objects and energized in the event of trouble with said mobile objects for transmission of distress messages by means of phase-shift-keyed signals occupying the common frequency band and representing a sequence of two components alternating in accordance with the message transmitted, said emergency radio stations being subdivided into groups each having a particular pattern of each of said components of said phase-shift-keyed signal;

at least one low orbiting earth satellite for retransmission of the signals emitted by said emergency radio stations;

at least one receiving station for reception of the signals retransmitted by said low orbiting earth satellite, reproduction of transmitted messages, and location of said mobile objects;

at least one control station for tracking of said earth satellite and measurement of the ephemeris thereof;

a communication link for connection of said receiving station with said control station;

said receiving station comprises a receiving antenna, a receiver having an input and an output, said input of said receiver being connected to said receiving antenna, a reference-frequency oscillator having an output, a plurality of signal processing means equal in number to said groups of emergency radio stations, and a computer for calculation of the coordinates of said emergency radio stations having a first input and a second input, said first input of said computer being connected with said communication link;

each of said signal processing means comprising: a first filter and a second filter matched to said first and second components, respectively, of the signals emitted by the emergency radio stations belonging to one of said groups of said emergency radio stations, each of said filters having an input connected with said output of said receiver, and an output;

a first detector and a second detector each having an input and an output, said inputs of said first and second detectors being connected with said outputs of said first and second filters, respectively;

an adder having a first input and a second input and an output, said first and second inputs of said adder being connected with said outputs of said first and second detectors, respectively;

tracking systems with a second-order astaticism for measurement of the running phase of the envelopes of the signals received from said emergency radio stations, each of said tracking systems having a first and a second input and a first and a second output; said first inputs of said tracking systems being connected with said output of said reference-frequency oscillator;

said first outputs of said tracking systems being connected with said second input of said computer;

gates equal in number to said tracking systems, said gates each having a signal input, inhibit inputs with their number equal to the number of said tracking systems minus one, and an output, said signal input of each of said gates being connected to said input of said adder, said output of each of said gates being connected to said second input of one of said tracking systems, said inhibit inputs of each of said gates being connected with said second outputs of the remaining tracking systems, respectively; and decoders for decoding of the messages transmitted by said emergency radio stations, the number of said decoders being equal to that of said tracking systems, each of said decoders having a first input, a second input, and a control input, said first and second inputs of each of said decoders being connected with said outputs of said first and second detectors, respectively, said control input of each of said decoders being connected with said second output of one of said tracking systems.

2. A system as defined in claim 1, further comprising at least one geostationary satellite for retransmission of signals from said low orbiting earth satellite to said receiving station.

3. A system as defined in claim 1, wherein each of said signal processing means further comprises additional gates equal in number to said tracking systems, said gates each having number being equal to that of said tracking systems minus one; and wherein the control input of each of said decoders is connected with said second output of one of said tracking systems via one of said additional gates, the inhibit inputs of each of said additional gates being connected to said second outputs of the remaining tracking systems, respectively.

4. A system, as defined in claim 1, wherein each of said tracking systems comprises:

a frequency divider with two values of the division ratio, having a first and a second input and an output, the first value of the division ratio ensuring a repetition period of the signals from said output of said frequency divider smaller than the repetition period of the signals emitted by said emergency radio stations, the second value of the division ratio ensuring a repetition period of the signals from said output of said frequency divider equal to the repetition period of the signals emitted by said emergency radio stations;

a tracking strobe and selector pulse shaper having an input, a first output and a second output, said input of said tracking strobe and selector pulse shaper being connected with said output of said frequency divider;

a gate having a signal input, an enable input, and an output, said signal input of said gate being connected with said first output of said tracking strobe and selector pulse shaper, said output of said gate representing said second output of said tracking system;

a time discriminator for generation of a misalignment voltage depending on the time shift between the tracking strobes and the signal from said output of said adder, said time discriminator having a first input, a second input, and an output, said first input of said time discriminator representing said second input of said tracking system, said second input of said time discriminator being connected with said second output of said tracking strobe and selector pulse shaper;

a feedback circuit including a first integrator having an input connected to said output of said time discriminator and an output, an amplifier having an input connected to said output of said time discriminator, and an output, an adding network having two inputs of which the first one is connected with said output of said first integrator, while the second one is connected with said output of said amplifier, and an output, and a second integrator having an input connected to said output of said adding network and an output;

a phase shifter for shifting of the tracking strobes according to the magnitude of the signal from said output of said second integrator in said feedback circuit, said phase shifter having a first and a a second input and an output, said first input of said phase shifter representing said first input of said tracking system, said second input of said phase shifter being connected with said output of said second integrator in said feedback circuit, said output of said phase shifter being connected to said first input of said frequency divider;

a phase meter for measurement of the amount of displacement of the tracking strobes which determines the running phase of the envelope of the signal received from one of said emergency radio stations, said phase meter having a first input, a second input, a third input, and an output, said first input of said phase meter being connected to said first input of said phase shifter, said second input of said phase meter being connected with said output of said phase shifter, said output of said phase meter representing said first output of said tracking system; and a control circuit for generation of a control signal defining said second value of the division ratio of said frequency divider, said control circuit including a coincidence circuit, an integrating circuit, and a high input impedance amplifier connected in series, said coincidence circuit having two inputs, the first input being connected with said first output of said tracking strobe and selector pulse shaper, and the second input being connected with said first input of said time discriminator, said amplifier of said control circuit having an output connected with said second input of said frequency divider, with said third input of said phase meter, and with said enable input of said gate.

5. A system as defined in claim 2, wherein each of said signal processing means further comprises additional gates with their number equal to that of said tracking systems, said additional gates each having inhibit inputs equal in number to said tracking systems minus one; and wherein the control input of each of said decoders is connected with said second output of one of said tracking systems via one of said additional gates, the inhibit inputs of each of said additional gates being connected to said second outputs of the remaining tracking systems, respectively.

6. A system as defined in claim 5, wherein each of said tracking systems comprises:

a frequency divider with two values of the division ratio having a first input, a second input, and an output, the first value of the division ratio ensuring a repetition period of the signals from said output of said frequency divider smaller than the repetition period of the signals emitted by said emergency radio stations, the second value of the division ratio ensuring a repetition period of the signals from said output of said frequency divider equal to the repetition period of the signals emitted by said emergency radio stations;

a tracking strobe and selector pulse shaper having an input, a first output and a second output, said input of said tracking strobe and selector pulse shaper being connected with said output of said frequency divider;

a gate having a signal input, an enable input, and an output; said signal input of said gate being connected with said first output of said tracking strobe and selector pulse shaper, said output of said gate representing said second output of said tracking system;

a time discriminator for generating a misalignment voltage depending on the time shift between the tracking strobes and the signals from said output of said adder, said time discriminator having a first input, a second input, and an output, said first input of said time discriminator representing said second input of said tracking system, said second input of said time discriminator being connected with said second output of said tracking strobe and selector pulse shaper;

a feedback circuit including a first integrator having an input connected with said output of said time discriminator and an output, an amplifier having an input connected to said output of said time discriminator and an output, an adding network having two inputs, the first input being connected with said output of said first integrator and the second output being connected with said output of said amplifier, and an output, and a second integrator connected to said output of said adding network, and an output;

a phase shifter for shifting of tracking strobes according to the magnitude of the signal from said output of said second integrator in said feedback circuit, said phase shifter having a first input, a second input, and an output, said first input of said phase shifter representing said first input of said tracking system, said second input of said phase shifter being connected with said output of said second integrator in said feedback circuit, said output of said phase shifter being connected to said second input of said frequency divider;

a phase meter for measurement of the amount of displacement of the tracking strobes which determines the running phase of the envelope of the signal received from one of said emergency radio stations, said phase meter having a first input, a second input, a third input, and an output, said first input of said phase meter being connected to said first input of said phase shifter, said second input of said phase meter being connected to said output of said phase shifter, said output of said phase meter representing said first output of said tracking system; and a control circuit for generation of a control signal defining said second value of the division ratio, said control circuit including a coincidence circuit, an integrating circuit and a high input impedance amplifier connected in series, said coincidence circuit having two inputs, the first input being connected with said first output of said tracking strobe and selector pulse shaper and the second input being connected with said first input of said time discriminator, said amplifier of said control circuit having an output connected with said second input of said frequency divider, with said third input of said phase meter, and with said enable input of said gate.

* * * * *